US010103942B2

(12) United States Patent
Shi et al.

(10) Patent No.: US 10,103,942 B2
(45) Date of Patent: Oct. 16, 2018

(54) COMPUTER PROCESSING METHOD AND SYSTEM FOR NETWORK DATA

(75) Inventors: Ju Wei Shi, Beijing (CN); Wen Jie Wang, Shanghai (CN); Wei Xue, Beijing (CN); Bo Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1874 days.

(21) Appl. No.: 13/433,442

(22) Filed: Mar. 29, 2012

(65) Prior Publication Data
US 2012/0284384 A1 Nov. 8, 2012

(30) Foreign Application Priority Data

Mar. 29, 2011 (CN) .......................... 2011 1 0076719

(51) Int. Cl.
*G06F 15/173* (2006.01)
*H04L 12/24* (2006.01)

(52) U.S. Cl.
CPC .......... *H04L 41/0893* (2013.01); *H04L 41/12* (2013.01)

(58) Field of Classification Search
CPC ... H04L 41/12; H04L 12/585; H04L 12/5895; H04L 51/12; H04L 51/38; H04L 43/16; H04L 45/14; H04L 63/0815; H04L 63/102; H04L 12/2602; H04L 29/06027; H04L 29/12594; H04L 43/00; H04L 61/3015; H04L 63/061; H04L 63/08; H04L 63/0869; H04L 63/104; H04L 9/0822; H04L 9/0844; H04L 12/1804; H04L 12/2697; H04L 12/2856; H04L 12/4035; H04L 12/413; H04L 1/0009; H04L 1/007; H04L 1/02; H04L 1/0618; H04L 1/1607;
(Continued)

(56) References Cited

U.S. PATENT DOCUMENTS 7,466,663 B2 * 12/2008 Young et al. ........... G06F 19/12
7,818,272 B1 10/2010 Mishra
(Continued)

FOREIGN PATENT DOCUMENTS

CN 101661482 A 3/2010
CN 101944045 A 1/2011

OTHER PUBLICATIONS

Purnamrita Sarkar, "Fast Nearest-neighbor Search in Disk-resident Graphs".Feb. 5, 2010CMU-ML-10-100,School of Computer Science Carnegie Mellon University, Pittsburgh, PA.
(Continued)

*Primary Examiner* — Chris Parry
*Assistant Examiner* — Soe M Hlaing
(74) *Attorney, Agent, or Firm* — Jennifer R. Davis; Offerstedt, Ellenbogen & Kammer, LLP

(57) ABSTRACT

A computer processing method includes receiving network data; filtering a node with a degree higher than a predefined threshold in the network data; storing the filtered node and its neighborhood relationship; clustering the filtered network data to obtain primary group(s); and obtaining a final group based on the filtered node and its neighborhood relationship and the primary group(s). The computer processing method and a corresponding system can be applicable to the processing for network data of large scale, and reduce greatly the processing time for clustering the network data of large scale, and the invention can be implemented well in parallel.

19 Claims, 8 Drawing Sheets

(58) Field of Classification Search
CPC ..... H04L 2001/0096; H04L 2012/5626; H04L 2012/5636; H04L 29/06; H04L 29/12009; H04L 29/12207; H04L 41/0654; H04L 41/0896; H04L 41/5051; H04L 41/5061; H04L 43/045; H04L 43/065; H04L 43/0876; H04L 43/50; H04L 45/04; H04L 45/12; H04L 45/46; H04L 47/10; H04L 47/14; H04L 47/20; H04L 47/263; H04L 61/20; H04L 63/1416; H04L 65/1069; H04L 65/4084; H04L 67/04; H04L 67/1002; H04L 67/1008; H04L 67/1031; H04L 67/1095; H04L 67/1097; H04L 67/14; H04L 67/2847; H04L 69/329; H04L 69/40; H04L 7/027; H04L 41/0893

See application file for complete search history.

(56) References Cited

U.S. PATENT DOCUMENTS

| | | | |
|---|---|---|---|
| 2005/0021531 | A1 | 1/2005 | Wen et al. |
| 2009/0315890 | A1 | 12/2009 | Modani |
| 2010/0022752 | A1* | 1/2010 | Young et al. ........... G06F 19/12 |
| 2010/0063973 | A1 | 3/2010 | Cao et al. |
| 2010/0309206 | A1* | 12/2010 | Xie et al. ............... G06T 11/206 |
| 2010/0313205 | A1* | 12/2010 | Shao ...................... H04L 43/50 |
| 2012/0143882 | A1* | 6/2012 | Zheng et al. .......... G06Q 10/08 |

OTHER PUBLICATIONS

Shawndra Hill, et al. "Social Network Signatures: A Framework for Re-Identification in Networked Data and Experimental Results". Computational Aspects of Social Networks, 2009.

"X-Rime:Hadoop based large scale social network analysis" downloaded from http://xrime.sourceforge.net on Mar. 26, 2012.

Y. Zhang et al., "Parallel Community Detection on Large Networks with Propinquity Dynamics," Proceedings of the 15th ACM SIGKDD International Conference on Knowledge Discovery and Data Mining, 2009, p. 997-1005, Association for Computing Machinery (ACM).

F. Protti et al., "On Computing All Maximal Cliques Distributedly," Proceedings of the 4th International Symposium on Solving Irregularly Structured Problems in Parallel, 1997, p. 37-48, Lecture Notes in Computer Science (LNCS) vol. 1253, Springer.

M. E. J. Newman & M. Girvan, "Finding and Evaluating Community Structure in Networks," Physical Review E (PRE), Feb. 2004, vol. 69, iss. 2, p. 026113(15), American Physical Society (APS).

M. E. J. Newman, "Finding Community Structure in Networks Using the Eigenvectors of Matrices," Physical Review E (PRE), Sep. 2006, vol. 74, iss. 3, p. 036104(19), American Physical Society (APS).

B. Yang et al., "Complex Network Clustering Algorithms," Journal of Software, Jan. 2009, vol. 20, iss.1, p. 54-66, Institute of Software Chinese Academy of Sciences (ISCAS).

\* cited by examiner

COMPUTER PROCESSING METHOD AND SYSTEM FOR NETWORK DATA

CROSS-REFERENCE TO RELATED APPLICATION(S)

This application claims foreign priority to P.R. China Patent application 201110076719.X filed 29 Mar. 2011, the complete disclosure of which is expressly incorporated herein by reference in its entirety for all purposes.

BACKGROUND

The present invention generally relates to the information processing technology field, and in particular, to a computer processing method and system for network data.

Nowadays, as information technology, especially network technology, develops, information is transferred between respective information nodes, so lots of such network data reflecting the relation between information nodes exists on the network. With respect to the large amounts of network data and network data of large scale, there are many technical analysis requirements now, i.e., how to find the relationship between these information nodes, for example, detecting nodes having abnormal behavior from the network, or filtering junk e-mails, and so on.

However, when processing large scale network data including lots of nodes, for example when the nodes relating to network data to be processed reach $10^5$ or larger, the existing technology seems to be inadequate, and even helpless. FIG. 1 shows performance estimation for a community detection method which has been a technical hotspot now (for details, see reference document [1] Y. Zhang, J. Wang, Y. Wang, L. Zhou. Parallel Community Detection on Large Networks with Propinquity Dynamics. ACM SIGKDD '09 (PP:997-1005), expressly incorporated herein by reference in its entirety for all purposes), the data set processed by which being three-month post records of some Bulletin Board System (BBS) website, in which the relationship between users is established by replies to a post. This method is implemented and run on Hadoop MapReduce flat, which is composed of a total of six X86 cluster machine nodes, of which the average CPU is dual-core 1.66 G, and average memory is 4G. From FIG. 1, it can be found that when the number of users increases to 0.2 million, the processing time rapidly increases to more than 27 hours, and if the data scale continues to grow, the processing time increases exponentially, so obviously, utilizing the above method cannot process them.

Thus, it is desirable to provide a computer processing method and system for network data.

SUMMARY

One aspect of the invention provides a computer processing method for network data, comprising: receiving network data; filtering a node with a degree higher than a predefined threshold in the network data; storing the filtered node and its neighborhood relationship; clustering the filtered network data to obtain primary group(s); and obtaining a final group based on the filtered node and its neighborhood relationship and the primary group(s).

Another aspect of the invention provides a computer system for processing network data, comprising: a receiving means, configured to receive network data; a filtering means, configured to filter a node with a degree higher than a predefined threshold in the network data; a storing means, configured to store the filtered node and its neighborhood relationship; a clustering means, configured to cluster the filtered network data to obtain primary group(s); and a final grouping means, configured to obtain a final group based on the filtered node and its neighborhood relationship and the primary group(s).

The computer processing method and system provided by the invention which can accelerate network data processing may be applicable to the processing for network data of large scale, and the processing time for clustering network data of large scale will be greatly reduced. The invention can also be parallelized, to facilitate its common embodiments.

BRIEF DESCRIPTION OF THE DRAWINGS

The features and advantages of the embodiments of the invention will be particularly explained with reference to the appended drawings. If possible, the same or like reference number denotes the same or like component in the drawings and the description. In the drawings.

DETAILED DESCRIPTION

Below, the exemplary embodiments of the invention will be described in detail with reference to the drawings in which the embodiments of the invention are illustrated, and like reference number always indicates the same element. It should be understood that the invention is not limited to the disclosed exemplary embodiments. It should be also understood that not every feature of the method and apparatus is necessary for implementing the invention to be protected by any claim. In addition, in the whole disclosure, when displaying or describing the process or the method, the steps of the method can be executed in any order or simultaneously, unless it is clear from the context that one step depends on another previously-executed step. In addition, there may be a prominent time interval between the steps.

Generally, the association extent between nodes in network data is referred to as a degree by a person skilled in the art. For example, if a node V1 is associated with 5 other nodes, it can be considered that the node V1 has a degree of 5 in the network data. If each node in the network data is considered as a point, lines are connected between nodes which are associated to form a graph (also referred to interchangeably as a map). Embodiments of the invention are applicable to both directional network data and undirectional network data. It is particularly noted by the inventor during study and practice that, in network data of large scale, the associations between nodes are not usually uniform, some nodes are tightly associated with other many other nodes, but most of the nodes are associated with only a few nodes. Just based on this natural non-uniformity, the inventor proposed the invention in a new way.

Figure 1:
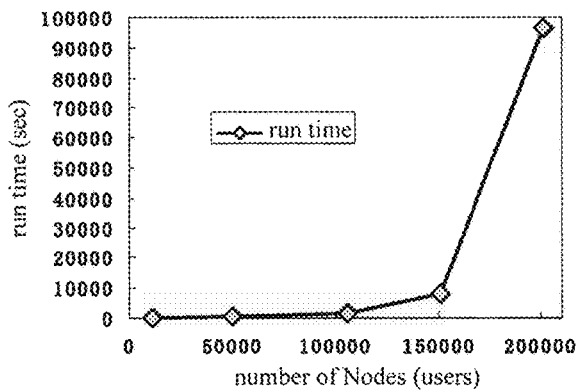
FIG. 1 shows performance evaluation for the existing community discovery method.
Figure 2:
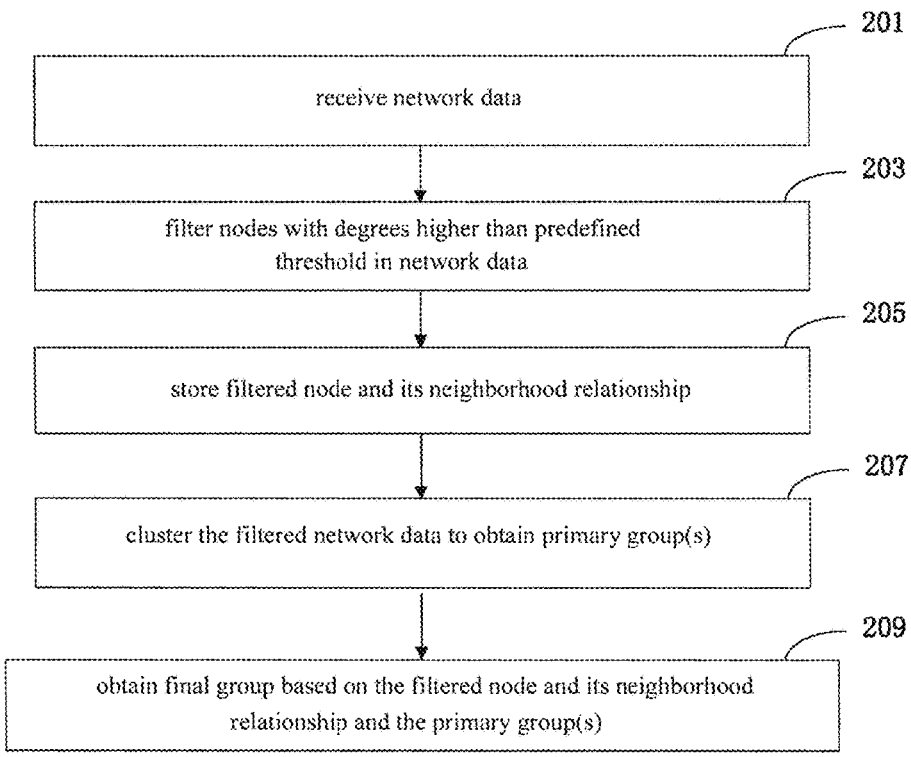
FIG. 2 shows a first embodiment of the computer processing method of the invention for network data.

FIG. 2 shows a first embodiment of the computer processing method of the invention for network data. In step 201, the network data is received. The network data can be obtained in many ways. For example, in a mobile Call Detail Record, the communicating parties can be extracted as the nodes, with the lines about whether the communication is on, to construct the network data. In addition, the connections between the webpages can be constructed as the network data. Also for example, in Facebook, the announced friendship can be constructed as the network data. The network data can be represented by an adjacency list (a neighborhood table) or an adjacency matrix (a neighborhood matrix), and can be presented to users in a graphical (map-like) way.

In step 203, a node with a degree higher than a predefined threshold in the network data is filtered. For setting the predefined threshold, a different predefined threshold can be set by the person skilled in the art according to particular dataset, and the predefined threshold can be an absolute value of the degree. In addition, it can be also considered to filter a certain percentage of nodes. In particular, the degree distribution of all the nodes in the network data is statistically calculated, and preferably, the degrees of all the nodes can be ordered in an ascending order or a descending order. A degree of any node from a certain percentage range (preferably, the first 5.5%-1%) of nodes with high degrees in all the nodes is selected, as the predefined threshold.

In step 205, the filtered node and its neighborhood relationship are stored. In this step, the neighborhood relationship is represented by a set of nodes adjacent to the filtered node. For example, a node V16 is adjacent to nodes V15, V18, V19, V17 and V12, the node V16 is filtered, and the node V16 and its neighborhood relationship V15, V18, V19, V17 and V12, can be stored. The storage manner can include storing them in a memory or storing them in a non-volatile memory medium.

In step 207, the filtered network data is clustered to obtain a primary group(s). In this step, the network data which is represented by the nodes and the lines can be clustered to be grouped. The person skilled in the art can select any suitable clustering algorithm according particular data to obtain the primary group(s). For example, for the community discovery, the methods as proposed in reference document [1], or reference document [2], Fábio Protti, Felipe M. G. Franca, Jayme Luiz Szwarcfiter, On Computing All Maximal Cliques Distributedly, Proceedings of the 4th International Symposium on Solving Irregularly Structured Problems in Parallel, 1997 (expressly incorporated herein by reference in its entirety for all purposes), can be used.

In step 209, a final group is obtained based on the filtered node and its neighborhood relationship and the primary group(s). In this step, the primary group(s) associated with the filtered node is determined based on the neighborhood relationship of the filtered node, and then it is further determined whether the filtered node belongs to a certain or some certain primary group(s), to finally obtain the final group.

Figure 3:
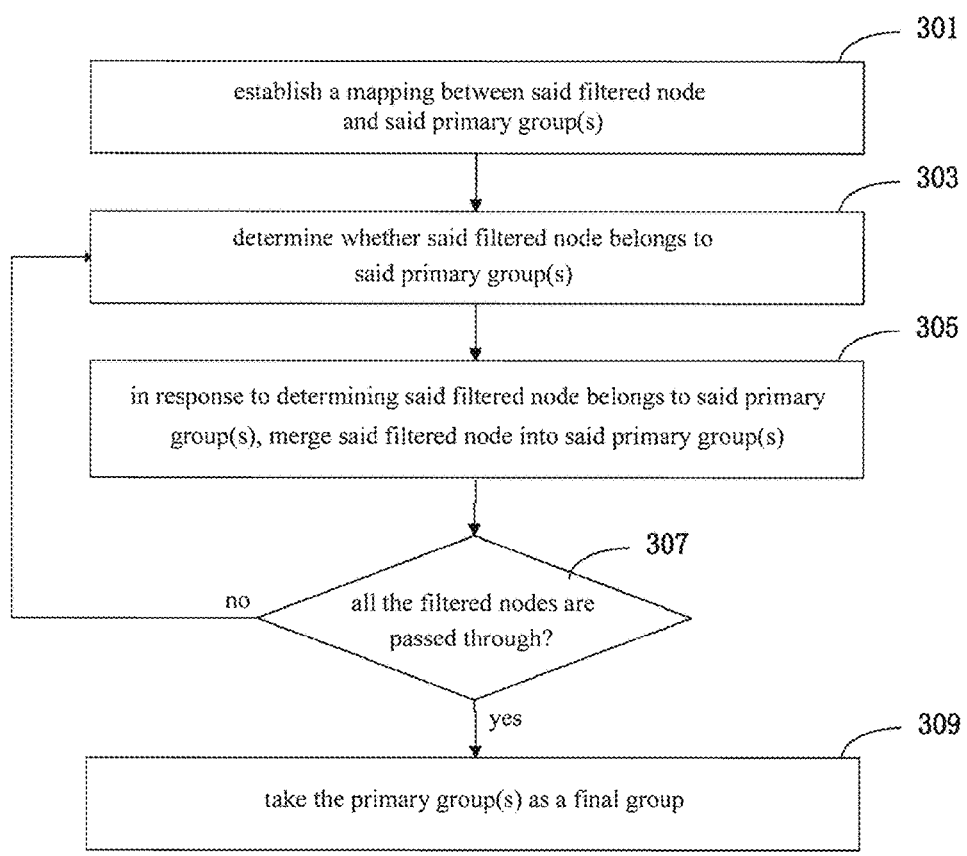
FIG. 3 shows a preferred embodiment for obtaining a final group based on the filtered node and its neighborhood and the primary group(s)

FIG. 3 shows a preferred embodiment for obtaining a final group based on the filtered node and its neighborhood and the primary group(s). In step 301, based on the stored neighborhood relationship, a mapping between the filtered node and the primary group(s) is established. In particular, the primary group(s) which includes at least one node in its neighborhood relationship is determined, and these primary groups are the potential groups into which the filter node may be merged. The filtered node is associated with the primary group(s) including the nodes in the neighborhood relationship.

In step 303, it is determined whether the filtered node belongs to the primary group(s). Preferably, an average degree of the nodes in the primary group(s) is calculated, in which, the average degree is the sum of the degree of all the nodes in the primary group(s) divided by the number of all the nodes in the primary group(s). And an actual association degree of the filtered node with respect to the nodes in the primary group(s) is calculated, in which, the actual association degree is the sum of the number of the lines between the filtered node and the nodes in the primary group(s). Whether the actual association degree is larger than the average degree is further determined, and in response to determining the actual association degree is larger than the average degree, it is determined that the filtered node belongs to the primary group(s). Of course, the person skilled in the art may conceive other embodiments for determining whether the filtered node belongs to the primary group(s) based on the application.

In step 305, in response to determining that the filtered node belongs to the primary group(s), the filtered node is merged into the primary group(s).

In step 307, it is judged whether all the filtered nodes are passed through, and if there is any filter node having not been processed, the steps 303-305 are repeatedly executed.

In step 309, in response to merging all the filtered nodes into their corresponding primary group(s), regarding the primary group(s) as the final group(s).

Figure 4:
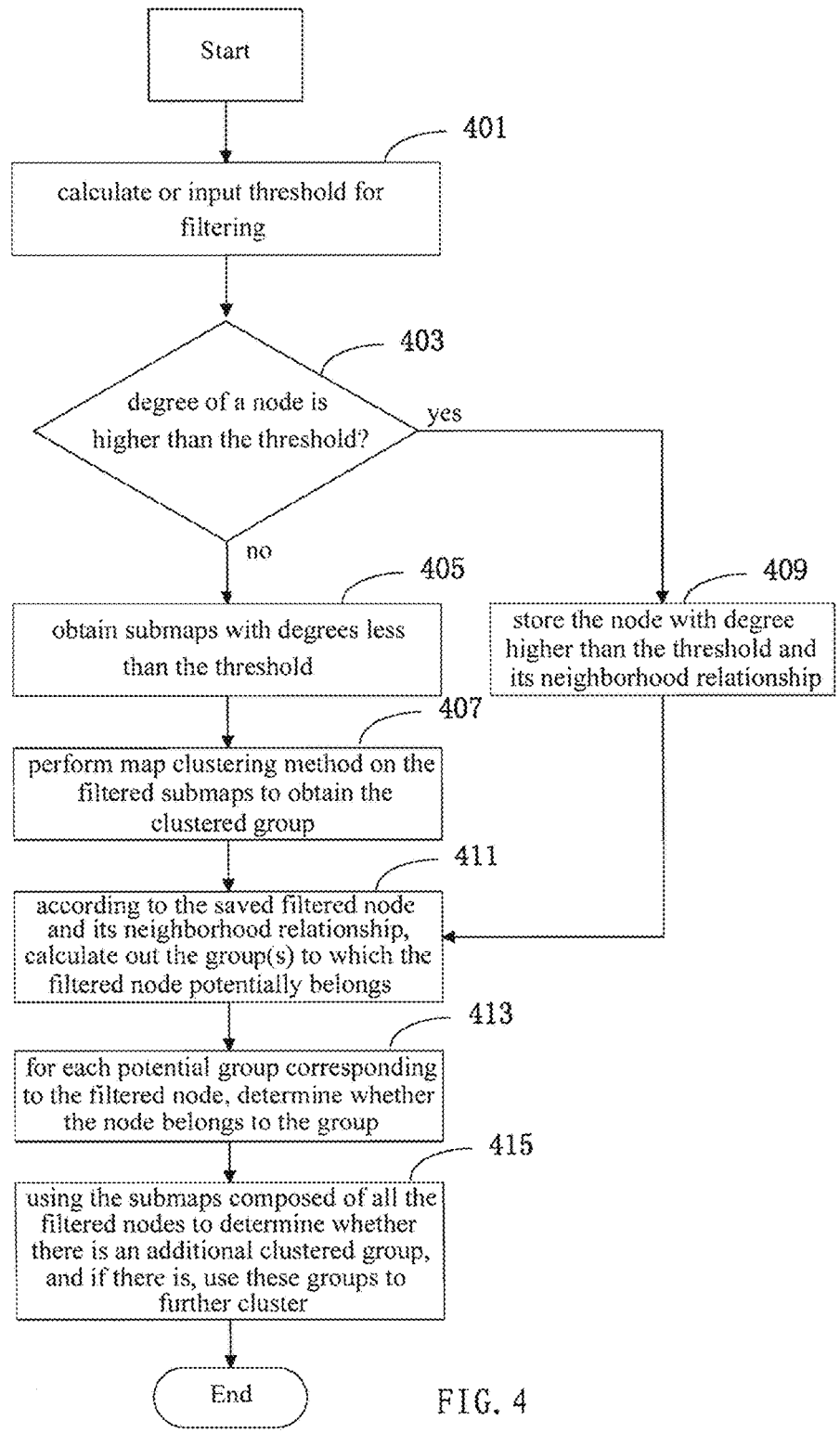
FIG. 4 shows a second embodiment of the computer processing method of the invention for network data.

FIG. 4 shows a second embodiment of the computer processing method of the invention for network data. In the embodiment, the network data is represented as a graph (map), in which the data nodes are as the nodes of the graph (map), and the associations between the data nodes are represented by the lines of the graph (map). In step 401, the predefined degree threshold for filtering is calculated or input by a user. In step 403, it is determined whether the degree of each node in the network data is higher than the predefined threshold. It is to be noted that, although the determination condition is set to be "higher than the predefined threshold," it should be understood that other equal embodiments for setting "higher than or equal to the predefined threshold" are within the protection scope of the invention. In step 405, after the above filtering step, sub-graphs (sub-maps) which are formed by all the nodes with the degrees less than or equal to the predefined threshold are obtained. In the step 407, a map clustering algorithm is performed on the sub-graphs (sub-maps), to obtain the clustered group. The person skilled in the art can select various traditional graph (map) clustering algorithms, such as the clustering algorithm based on modularity (see reference document [3], M. E. J. Newman and M. Girvan. Finding and evaluating community structure in networks. Physical Review E, 69(2):026113, 2004 (expressly incorporated herein by reference in its entirety for al purposes)) and the clustering algorithm based on spectrum (see reference document [4], M. E. J. Newman. Finding community structure in networks using the eigenvectors of matrices. Physical Review E, 74(3):036104, 2006 (expressly incorporated herein by reference in its entirety for all purposes)), according to the features of the actual data and needs. For those nodes with the degrees higher than the predefined threshold, in step 409, these nodes and the neighborhood relationships are stored to be used in the subsequent steps. In step 411, according to the saved filtered node and the neighborhood relationships, the groups to which the filtered node potentially belongs are calculated out. In step 413, for each potential group corresponding to the filtered node, it is determined whether the node belongs to the above group. Since the particular method for calculating out the potential groups and determining whether the filtered node belongs to the group has been described above, herein, it is not described again. Preferably, step 415 can be further added into the embodiment, in which, according to the sub-graphs (sub-maps) formed by all the filtered nodes, it is determined whether there is an additional clustering group, if there is, these groups are further clustered by a clustering method which can be various graph (map) clustering methods as mentioned above, to obtain a new group, and incorporate the new group into the final group, so as to obtain more complete grouping information.

Figure 5:
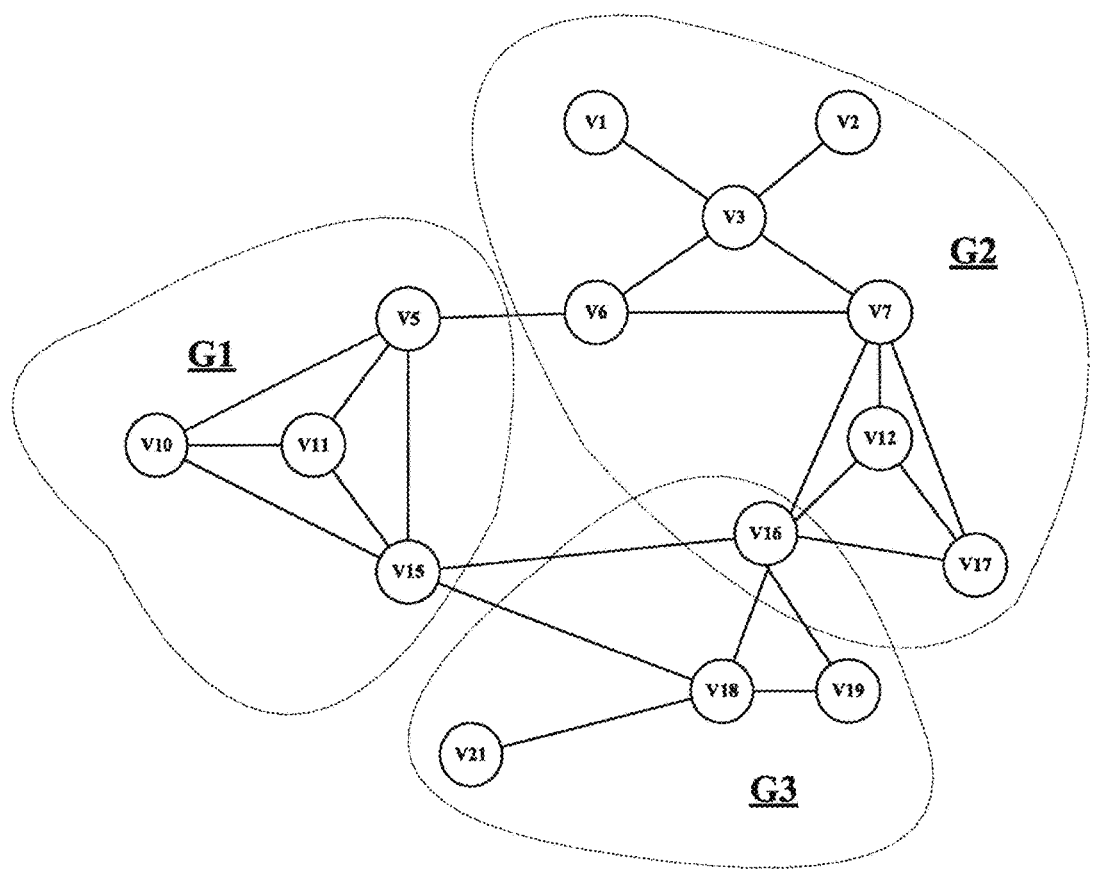
FIG. 5 shows an illustrative particular application example of the invention.

FIG. 5 shows an illustrative particular application example of the invention. In the unidirectional non-loop network data as shown in FIG. 5, Vs indicate user nodes, lines indicate associations between the user nodes. The particular application example needs to dig out the community from the shown network data. How to obtain related results by the application example is described below in detail:

1) calculating a predefined threshold for filtering, statistically calculating the degree of each node and ordering them, taking the first 1% of them as the predefined threshold for filtering, the predefined threshold of the graph (map) being 5;

2) discovering the degree of the node V16 in the graph (map) larger than 5 (the degree of V16 being 6), and thus saving the node V16 and its neighborhood relationship {V15, V18, V19, V17, V12 and V17};

3) performing community discovery on all the nodes except the node V16, by using the method as described in the reference document [2], which has a basic concept that each round of iterations, similarities between two points of all the points within two hops (jumps) are determined, two points which are similar but do not have a line are connected with a line, two points which are not similar but have a line are disconnected, when the variation of the network topology is less than a certain threshold, the iteration end, otherwise, the iteration goes not the next round of nodes. A simple description about the method of the reference document [2] is performed here, and the details can be found in the reference document itself. The network as shown in FIG. 5 after the iteration end will get 3 primary groups G1{V5,V10,V11,V15}, G2{V1,V2,V3,V6,V7,V12,V17}, and G3{V18,V19,V21};

4) using the results stored in 2), according to the neighborhood of V16, it is found the above 3 primary groups G1, G2 and G3 all include the nodes adjacent to them, so the node V16 could belong to the three primary groups G1, G2 and G3; and 5) calculating the average degrees of G1, G2, G3 respectively. The average degrees of G1, G2, G3 are 1.5, 1.6 and 0.7, while the actual association degrees of the node V16 with G1, G2 and G3 are 1, 3 and 2 respectively. Since it is determined that actual association degrees of the node V16 with G2 and G3 are larger than the average degrees of G2, G3, it can be determined that the V16 will be merged into G2 and G3, to form the final group result as shown in FIG. 5, G1{V5,V10,V11,V15}, G2{V1,V2,V3,V6,V7,V12,V16, V17}, G3{V16,V18,V19,V21}.

Figure 6:
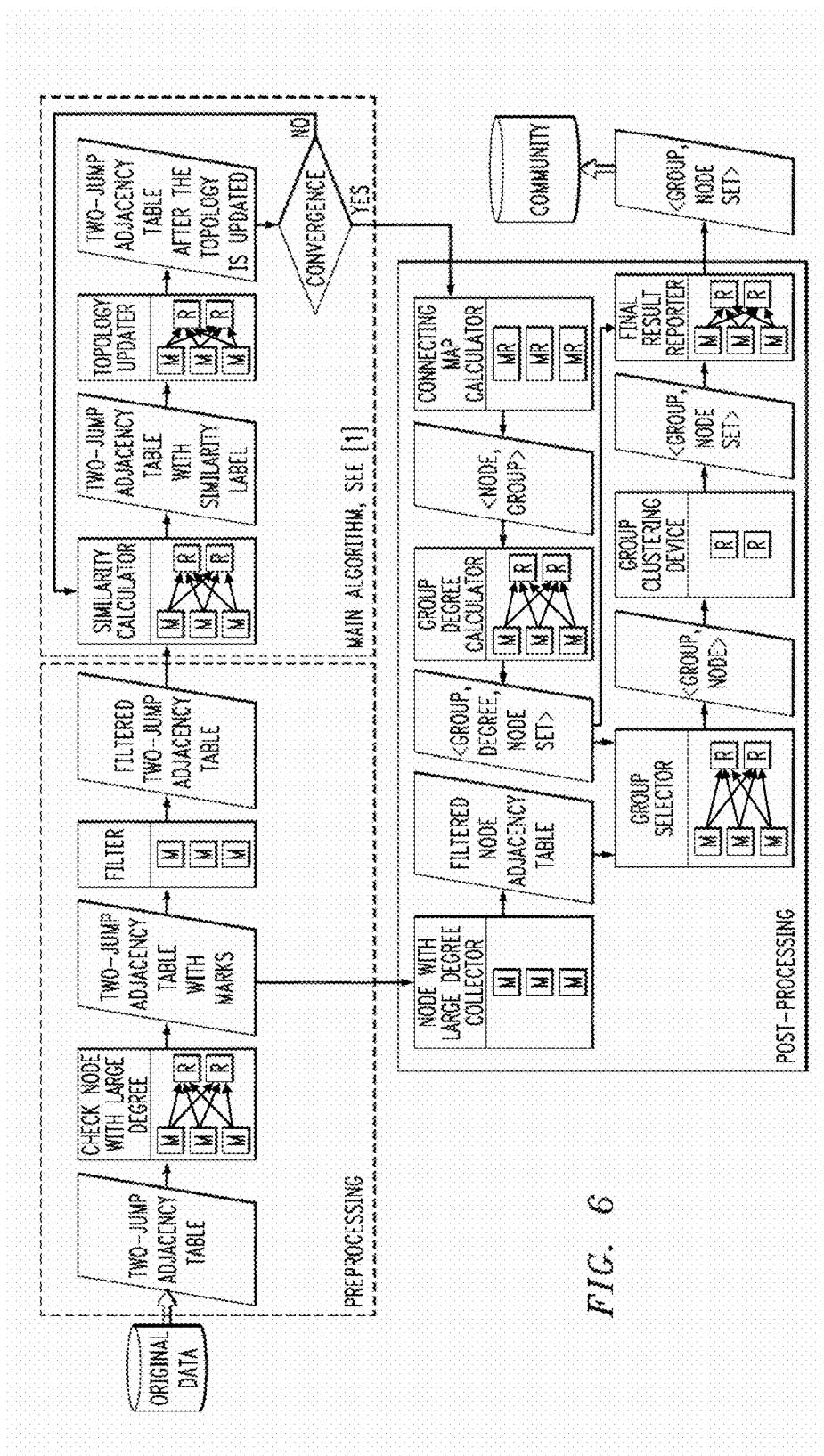
FIG. 6 shows a method of the invention which is implemented in parallel on a the cloud computing flat MapReduce.

Each particular embodiments of the invention is applicable to various implementing flats, such as the network data clustering processing realized by a single-machine, the network data clustering processing realized by parallel computing flat such as MapReduce and MPI. FIG. 6 illustratively shows a method of the invention which is implemented in parallel on the cloud computing flat Hadoop MapReduce. Each shadowed block in FIG. 6 represents a MapReduce job, M represents a Map task, and R represents a Reduce task, in which a connected map calculator is formed by several MapReduce jobs, and other modules are all one MapReduce job.

To realize the community discovery, the basic data structure of the network in MapReduce is a "two hop adjacency list", i.e., each row uses nodes as keys, the adjacency table of the nodes and the adjacency table of each node in the adjacency table are used as a value; meanwhile, the similarities of the node with respect to all the nodes in the two hop adjacency list should be stored in the value, and a certain value field is reserved for storing information such as marks and so on. For example, the two hop adjacency list of a node A is A-C (A, B, D), B (A, C), in which one-hop (one-jump) neighbors of A are B and C, one-hop (one-jump) neighbors of B include A and C, and one-hop (one-jump) neighbors of C include A, B and D. Such data structure is to facilitate realization of the main clustering method as described in the reference document [1].

During a preprocessing stage, by one MapReduce job, the nodes with degrees larger than a designated threshold are marked (the degree resolving is easily realized by one Map task, and each node stores an adjacency table, and the degree is the number of the members in the adjacency table), and the marked data is used as the input to a "filter" and a "large degree node collector."

During the main algorithm stage, a two hop adjacency list (two jumpadjacency matrix) set of the nodes with the output of the filter less than the designated threshold according to the main clustering method in the reference document [1], several rounds of iterations are performed to update the topology; each round of iteration uses a similarity calculator to obtain the similarities between nodes, and uses a topology updater to update the topology; and when the topology variation is less than the designated threshold, the iteration ends, and the main algorithm in the reference document [1] is completed.

During a post-processing stage, after the main algorithm is completed, a Connected Component Calculator is called to obtain the community corresponding to each node. In this regard, reference is made to X-RIME: Hadoop based large scale social network analysis, project available from SourceForge, expressly incorporated herein by reference in its entirety for all purposes, and in particular to a Weakly Connected Component implemented in X-RIME. At this time, a "group degree calculator" is called to calculate the average degree of each group. The key input by the "group degree calculator" is the nodes, value is the group number, the output key is the group, and the value is the average degree of the group together with the set of included nodes. Both the output (output 1) of the group degree calculator and the output (output 2) of the "large degree node collector" are used as the input of a "group selector" and the output of the "group selector" is the potential group(s) of the filtered node. During a Map stage, the "group selector" sends a {group, filtered node} key-value pair message to each neighbor of the filtered node according to the adjacency table of the filtered node, for example, if a node V has neighbors V1, V2, V3, V4 and V5, and V1 and V2 are grouped into g1,V3, V4 and V5 are grouped into g2, in this case, the "group selector" sends two <g1, V> to a reducer with g1 as a key, and sends three <g2,V> to a reducer with g2 as a key, so the number of the messages corresponding to V received in each group indicates the number of the neighbors of the node in the group, and the number is recoded as a label L. Further, a group clustering device may use the label L and the previously calculated group average degree to determine whether V really belongs to this group, and to finally obtain the final group result.

Figure 7:
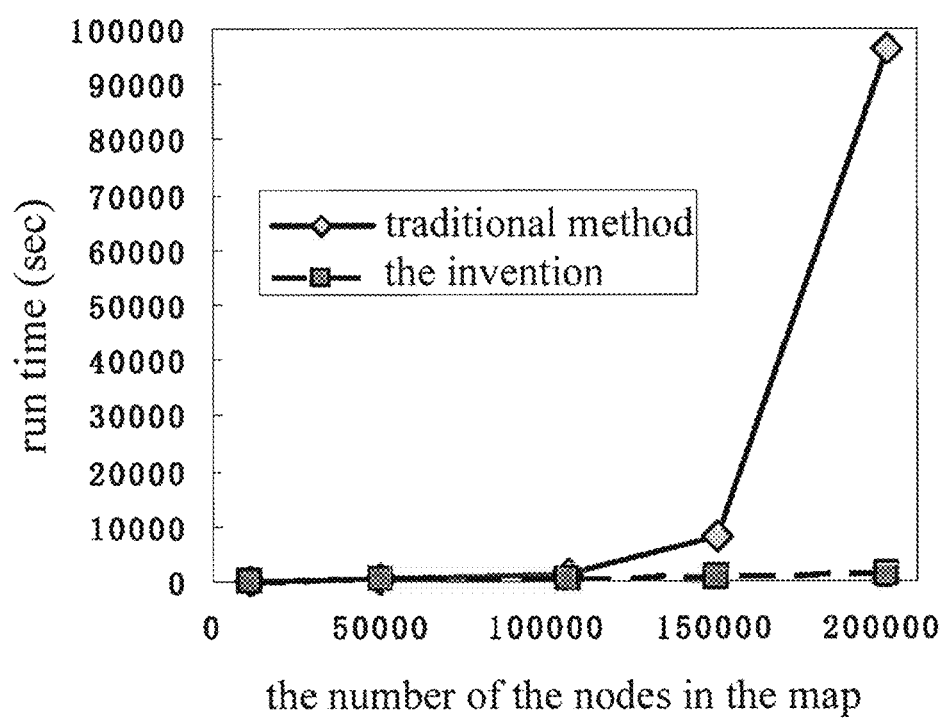
FIG. 7 shows an effect comparison between the method of the invention and the traditional method.

FIG. 7 shows an effect comparison for processing an example data set between a method in accordance with an embodiment of the invention and the only method in the reference document [1] or similar traditional method. These methods are all realized on a Hadoop MapReduce platform, and the clusters of the platform are composed of 6 blade servers with dual core of 1.66G and memory of 4G (Please note that a "platform" has also been referred to elsewhere herein as a "flat".) As shown in FIG. 7, after applying aspects of the invention, the time period to discover the community in the environment deployed by the embodiment saves about 92.3% of the time period used by the traditional method, when processing network data larger than a scale of 150000 nodes. The traditional processing method renders an exponential increase in the term of processing time for network data of large scale. Each particular embodiment of the invention can have unexpected technical effect(s) compared with the traditional method, the basic reason of which is the careful analysis of the distribution features of related network data, filtering the nodes with large degrees, and merging them into the primary groups, so that during the primary group clustering, the wasted calculating cost caused by the nodes with large degrees can be avoided. The resultant group result will not lose the original related information, but greatly increases the grouping efficiency, and obtains a prominent technical effect.

It should be understood that the above embodiments have been discussed with respect to a network of large scale, but embodiments of the invention are applicable to the network of normal scale, to obtain the corresponding gain. If the person skilled in the art will extend the method of the invention to other physical network data (such as sensor network(s) and so on) according to his or her professional knowledge, and adaptively modify various embodiments of the invention based on his or her knowledge in the art, which will be available too.

Figure 8:
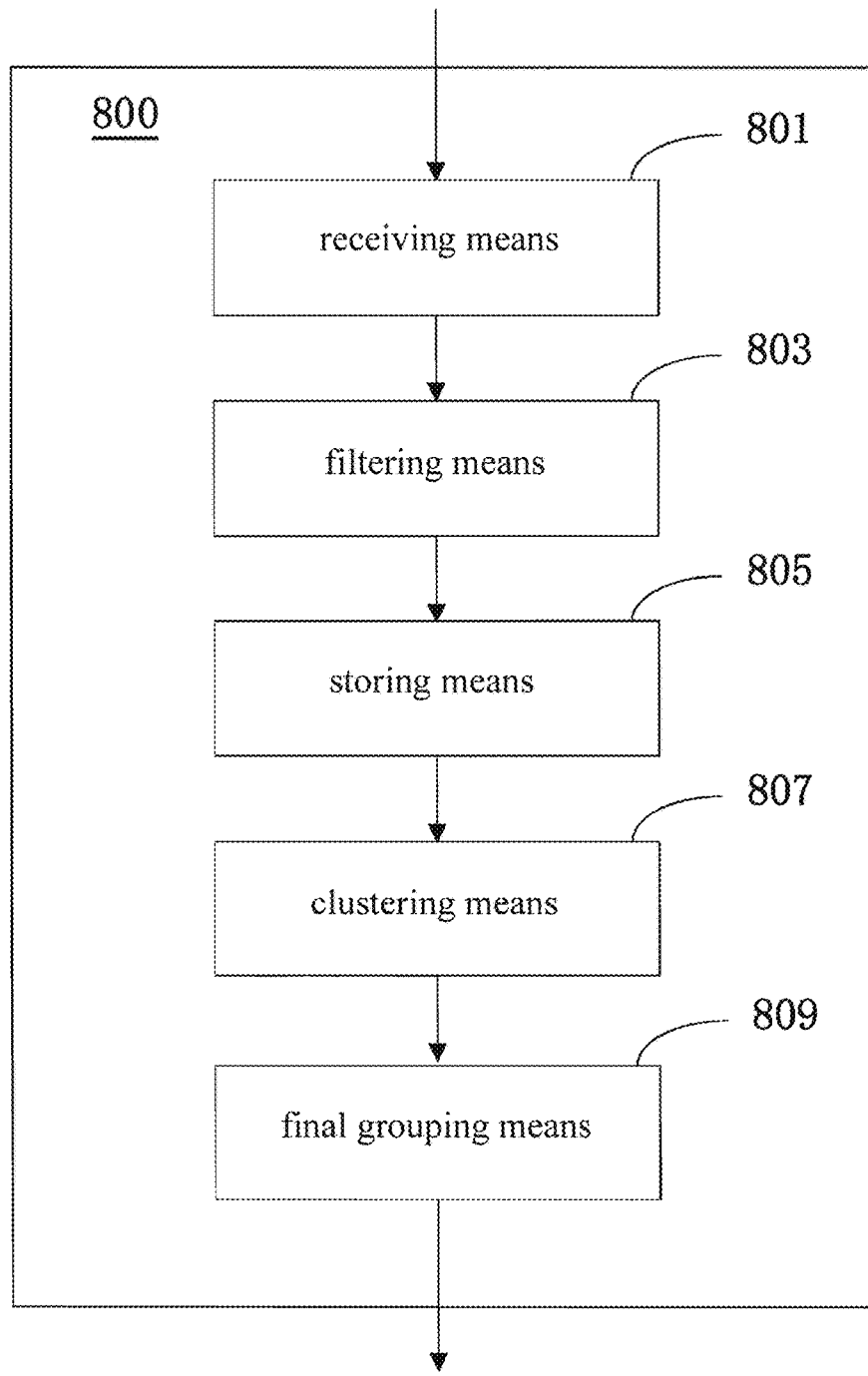
FIG. 8 shows a structural schematic diagram of the computer system of the invention for processing network data.

FIG. 8 shows a computer system 800 of the invention for processing network data. The computer system 800 includes a receiving means 801, configured to receive network data; a filtering means 803, configured to filter a node with a degree higher than a predefined threshold in the network data; a storing means 805, configured to store the filtered node and its neighborhood relationship; a clustering means 807, configured to cluster the filtered network data to obtain primary group(s); and a final grouping means 809, configured to obtain a final group based on the filtered node and its neighborhood relationship and the primary group(s).

Preferably, the final grouping means 809 includes: a mapping means, configured to, based on the stored neighborhood relationship, establish a mapping between the filtered node and the primary group(s); a judging means, configured to determine whether the filtered node belongs to the primary group(s); and a merging means, configured to, in response to determining the filtered node belongs to the primary group(s), merge the filtered node into the primary group(s).

Preferably, the final grouping means 809 further includes: a final group determining means, configured to, in response to merging all the filtered nodes into their corresponding primary group(s), regard the primary group(s) as the final group.

Preferably, the computer system 800 further comprises: a new grouping means, configured to cluster subnetwork data composed by the filtered nodes to form a new group; and an incorporating means, configured to incorporate the new group into the final group.

Preferably, the computer system 800 further comprises: a statistically-calculating means, configured to statistically calculate degree distribution of all the nodes in the network data; and a predefined threshold determining means, configured to select a degree of any node from a certain percentage range (preferably, the first 5.5%-1%) of nodes with high degrees in all the nodes, as the predefined threshold.

Preferably, the neighborhood relationship is represented by a set of nodes adjacent to the filtered node.

Preferably, the mapping means includes: a primary group determining means, configured to determine the primary group(s) including at least one node in the neighborhood relationship of the filtered node; and an associating means, configured to associate the filtered node with the determined primary group(s).

Preferably, the judging means includes: an average degree calculating means, configured to calculate an average degree of the nodes in the primary group(s); an actual association degree calculating means, configured to calculate an actual association degree of the filtered node with the nodes in the primary group(s); a comparing means, configured to determine whether the actual association degree is larger than the average degree; and a determining means, configured to, in response to determining that the actual association degree is larger than the average degree, determine that the filtered node belongs to the primary group(s).

Preferably, the computer system 800 is configured on MapReduce calculating flat.

Figure 9:
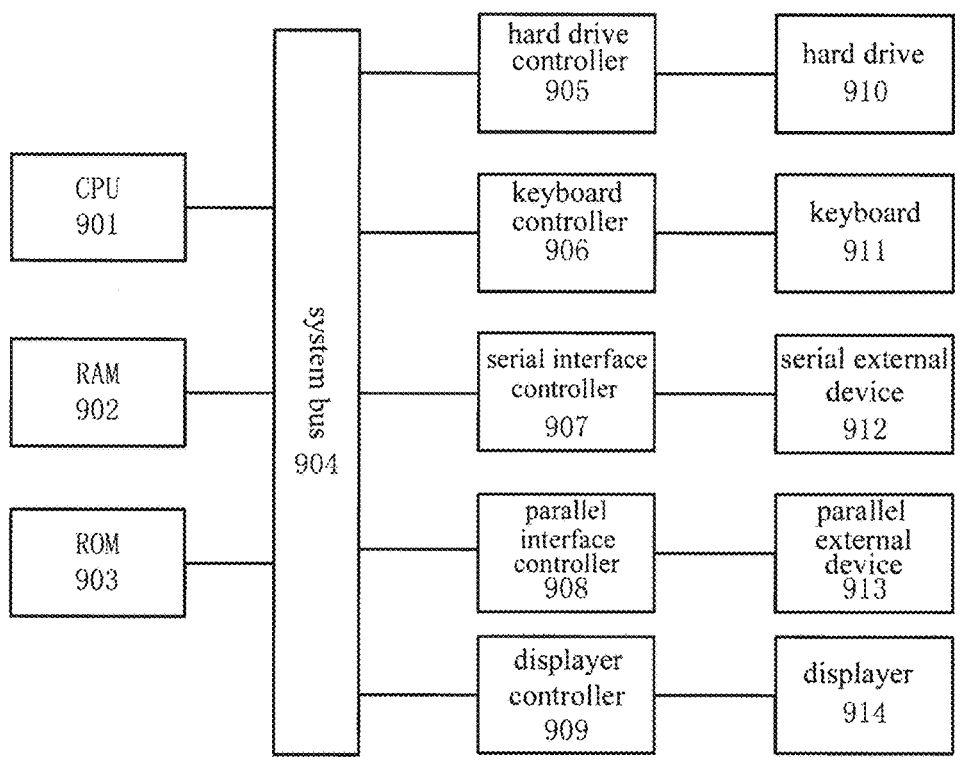
FIG. 9 shows a structural block diagram of computing devices which can realize the embodiments according to the invention.

FIG. 9 schematically shows a structural block diagram of computing devices which can realize the embodiments according to the invention. The computer system as shown in FIG. 9 includes CPU (Central Processing Unit) 901, RAM (Random Access Memory) 902, ROM (Read Only Memory) 903, system bus 904, hard drive controller 905, keyboard controller 906, serial interface controller 907, parallel interface controller 908, displayer controller 909, hard drive 910, keyboard 911, serial external device 912, parallel external device 913 and displayer 914. In these components, what is connected with the system bus 904 includes the CPU 901, the RAM 902, the ROM 903, the hard drive controller 905, the keyboard controller 906, the serial interface controller 907, the parallel interface controller 908 and the displayer controller 909. The hard drive 901 is connected with the hard drive controller 905, the keyboard 911 is connected with the keyboard controller 906, the serial external device 912 is connected with the serial interface controller 907, the parallel external device 913 is connected with the parallel interface controller 908, and the displayer 914 is connected with the displayer controller 909.

The function of each component in FIG. 9 is well-known in the technical art, and the structure as shown in FIG. 9 is general. This structure is applicable not only to personal computers, but also to handheld devices such as Palm PCs, PDAs (Personal Data Assistant), Mobile phones and so on. In different applications, for example, when realizing a user terminal including the client end module according to the invention or the server host including the network application server according to the invention, some components can be added into the structure as shown in FIG. 9, or some components can be omitted from FIG. 9. The whole system as shown in FIG. 9 is controlled by computer readable instructions stored in the hard drive 910, EPROMs or other non-volatile storages as software. The software can be downloaded from the network (not shown in the figure), or stored in the hard drive 910, or the downloaded software from the network can be loaded into the RAM 902, and executed by the CPU 901, to complete the functions determined by the software.

Although the computer system described in FIG. 9 can support the solutions provided by the invention, the computer system is only an example of the computer systems. The person skilled in the art will understand that many other computer system designs can realize the embodiments of the invention.

The invention can also be realized as a computer program product used by the computer system in FIG. 9, which can include codes for realizing the MMS transferring method provided by the invention. Before usage, the codes can be stored in the memories of other computer systems, for example, stored in a hard drive or a removable storage such as compact disk or floppy, or downloaded through the Internet or other computer networks.

In view of the discussion of FIG. 9, the skilled artisan will appreciate that any of the methods described herein can include an additional step of providing a system comprising distinct software modules embodied on a computer readable storage medium; the modules can include, for example, any or all of the elements depicted in the block diagrams and/or described herein; by way of example and not limitation, those shown in FIGS. 6 and 8. The method steps can then be carried out using the distinct software modules and/or sub-modules of the system, as described above, executing on one or more hardware processors 901. Further, a computer program product can include a computer-readable storage medium with code adapted to be implemented to carry out one or more method steps described herein, including the provision of the system with the distinct software modules. Such code can of course be stored thereon in a non-transitory manner.

Although the invention is described with reference to the preferred embodiments of the invention, it will be obvious by the person skilled in the art that without departing the spirit and scope of the invention defined by the appended claims, various modifications in form and detail can be performed on the invention.

What is claimed is:

1. A computer processing method for network data, comprising:
   receiving network data;
   filtering a node with a degree higher than a predefined threshold from the network data;
   storing the filtered node and its neighborhood relationship;
   clustering the filtered network data to obtain at least one primary group excluding the filtered node; and
   obtaining at least one final group by adding the filtered node to the at least one primary group based on the stored neighborhood relationship.

2. The method according to claim 1, wherein the obtaining of the at least one final group includes:
   based on the stored neighborhood relationship, establishing a mapping between the filtered node and the at least one primary group;
   determining whether the filtered node belongs to the at least one primary group; and
   in response to determining that the filtered node belongs to the at least one primary group, merging the filtered node into the at least one primary group.

3. The method according to claim 2, wherein a plurality of nodes are filtered to obtain a plurality of filtered nodes, the clustering is carried out to obtain a plurality of primary groups, and the obtaining of the at least one final group includes:
   in response to merging all the filtered nodes into their corresponding primary groups, regarding the primary groups as the final group.

4. The method according to claim 1, wherein a plurality of nodes are filtered to obtain a plurality of filtered nodes, further comprising:
   clustering subnetwork data composed by the filtered nodes to form a new group; and
   incorporating the new group into the final group.

5. The method according to claim 1, wherein a plurality of nodes are filtered to obtain a plurality of filtered nodes, further comprising:
   calculating degree distribution of all the nodes in the network data; and
   selecting a degree of any node from a certain percentage range of nodes with high degrees in all the nodes, as the predefined threshold.

6. The method according to claim 1, wherein the neighborhood relationship is represented by a set of nodes adjacent to the filtered node.

7. The method according to claim 6, wherein a plurality of nodes are filtered to obtain a plurality of filtered nodes and the clustering is carried out to obtain a plurality of primary groups, further comprising establishing a mapping between the filtered node and the at least one primary group by:
   determining the primary groups including at least one node in the neighborhood relationship of the filtered node; and
   associating the filtered node with the determined primary groups.

8. The method according to claim 1, wherein the obtaining of the at least one final group includes:
   based on the stored neighborhood relationship, establishing a mapping between the filtered node and the at least one primary group;
   determining whether the filtered node belongs to the at least one primary group; and
   in response to determining that the filtered node belongs to the at least one primary group, merging the filtered node into the at least one primary group;
   and wherein the determining whether the filtered node belongs to the at least one primary group includes:
   calculating an average degree of the nodes in the at least one primary group;
   calculating an actual association degree of the filtered node with the nodes in the at least one primary group;
   determining whether the actual association degree is larger than the average degree; and
   in response to determining the actual association degree is larger than the average degree, determining the filtered node belongs to the at least one primary group.

9. The method according to claim 1, wherein, the method is configured on a MapReduce computing platform.

10. A computer system for processing network data, comprising:
memory; and
at least one processor coupled to said memory, the at least one processor being configured:
to receive network data;
to filter a node with a degree higher than a predefined threshold in the network data;
to store the filtered node and its neighborhood relationship;
to cluster the filtered network data to obtain at least one primary group excluding the filtered node; and
to obtain a final group by adding the filtered node to the at least one primary group based on the stored neighborhood relationship.

11. The computer system according to claim 10, wherein the at least one processor being configured to obtain the final group includes the at least one processor being configured:
to, based on the stored neighborhood relationship, establish a mapping between the filtered node and the at least one primary group;
to determine whether the filtered node belongs to the at least one primary group; and
to, in response to determining that the filtered node belongs to the at least one primary group, merge the filtered node into the at least one primary group.

12. The computer system according to claim 11, wherein a plurality of nodes are filtered to obtain a plurality of filtered nodes, the clustering is carried out to obtain a plurality of primary groups, and the at least one processor being configured to obtain the final group further includes the at least one processor being configured:
to, in response to merging all the filtered nodes into their corresponding primary groups, regard the primary groups as the final group.

13. The computer system according to claim 10, wherein a plurality of nodes are filtered to obtain a plurality of filtered nodes, the at least one processor being further configured:
to cluster subnetwork data composed by the filtered nodes to form a new group; and
to incorporate the new group into the final group.

14. The computer system according to claim 10, wherein a plurality of nodes are filtered to obtain a plurality of filtered nodes, the at least one processor being further configured:
to statistically calculate degree distribution of all the nodes in the network data; and
to select a degree of any node from a certain percentage range of nodes with high degrees in all the nodes, as the predefined threshold.

15. The computer system according to claim 10, wherein the neighborhood relationship is represented by a set of nodes adjacent to the filtered node.

16. The computer system according to claim 15, wherein a plurality of nodes are filtered to obtain a plurality of filtered nodes, the clustering is carried out to obtain a plurality of primary groups, and the at least one processor being further configured:
to determine the primary groups including at least one node in the neighborhood relationship of the filtered node; and
to associate the filtered node with the determined primary groups.

17. The computer system according to claim 11, wherein the at least one processor being configured to determine whether the filtered node belongs to the at least one primary group includes the at least one processor being configured:
to calculate an average degree of the nodes in the at least one primary group;
to calculate an actual association degree of the filtered node with the nodes in the at least one primary group;
to determine whether the actual association degree is larger than the average degree; and
to, in response to determining the actual association degree is larger than the average degree, determine the filtered node belongs to the at least one primary group.

18. The computer system according to claim 10, wherein the computer system is configured on a MapReduce computing platform.

19. A computer program product comprising a non-transitory computer readable storage medium having computer readable program code embodied therewith, said computer readable program code comprising:
computer readable program code configured to receive network data;
computer readable program code configured to filter a node with a degree higher than a predefined threshold in the network data;
computer readable program code configured to store the filtered node and its neighborhood relationship;
computer readable program code configured to cluster the filtered network data to obtain at least one primary group excluding the filtered node; and
computer readable program code configured to obtain a final group by adding the filtered node to the at least one primary group based on the stored neighborhood relationship.

* * * * *